US006104359A

United States Patent [19]
Endres et al.

[11] Patent Number: 6,104,359
[45] Date of Patent: Aug. 15, 2000

[54] ALLOCATING DISPLAY INFORMATION

[75] Inventors: Raymond E. Endres, Kirkland; Stuart T. Laney, Seattle; Andre F. Vachon, Redmond, all of Wash.

[73] Assignee: Microsoft Corporation, Redmond, Wash.

[21] Appl. No.: 08/786,971

[22] Filed: Jan. 24, 1997

(Under 37 CFR 1.47)

[51] Int. Cl.$^7$ ...................................................... G09G 5/00
[52] U.S. Cl. ..................................................... 345/3; 345/1
[58] Field of Search .................................. 345/3, 1, 132, 345/115, 112, 326, 329, 333

[56] References Cited

U.S. PATENT DOCUMENTS

| | | | |
|---|---|---|---|
| 5,107,251 | 4/1992 | Frank et al. | 340/709 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,841,418 | 7/1999 | Bril et al. | 345/3 |
| 5,926,166 | 7/1999 | Kheherzadeh et al. | 345/3 |

OTHER PUBLICATIONS

Shirley, John and Rosenberry, Ward, "Microsoft RPC Programming Guide", O'Reilly & Associates, 1995.
Kramer, Matt, "Baranof's MailCheck 2.6 Delivers Improved Tools", PC Week, Sep. 11, 1995, Ziff–Davis Publishing Company 1995.
Frenkel, Gary, "cc:Mail View Keeps an Eye on Your Messaging System", Network Computing, Jun. 1, 1995, CMP Publications, Inc., 1995.
Summary of "Multiple Monitor Support on Macintosh Computers".
Inside Macintosh, Apple Computer, Inc., published 1985.
Webster, Bruce F., "Just How Compatible is Compatible?", MACWORLD, Nov. 1987, vol. 4, No.11, pp. 108–113.
Borrell, Jerry, "The Graphic Mac", MACWORLD, Nov. 1986, vol. 3, No. 11, pp. 100–105.
Ushijima, David, Chasing Rainbows, MACWORLD, Jul. 1987, Jul. 1987, vol. 4, No. 7, pp. 109–115.
Inside Macintosh, vol. V, Apple Computer, Inc., 1988.
Heid, Jim, "Working Smart", MACWORLD, Oct. 1995, pp. 145–146.
"A Mac of a Different Color", MACWORLD, Apr. 1987, vol. 4, No. 4, pp 132–133.
Heid, Jim, "Approaching the Mac II", MACWORLD, Jun. 1987, vol. 4, No. 6, pp. 130–133.
FairNet, (Mac)System 7.5: Advanced, at Internet site: fnft@aurora.alaska.edu.
"Multiple Monitor Display Boards", Appian Graphics, at Internet site: appiantech.com.
"HydraVision Press Release", Feb. 5, 1996, Appian Graphics, at Internet site: appiantech.com.
"Multiple Monitor Applications", Sep. 27, 1996, Appian Graphics, at Internet site: appiantech.com.
"Macintosh Computers Offer More Flexible Monitor Support", The Macintosh Advantage, Apple Computer, Sep. 27, 1996, at Internet site: product.info.ap...dvantages/monitor.html.
"Using Two Monitors", Sep. 27, 1996.
Poor, Alfred, "Double Vision: Appian's Impulse Graphics Card Gives Your Monitor a View–or Two", PC Magazine, May 14, 1996, Ziff–Davis Publishing Company 1996.

*Primary Examiner*—Regina Liang
*Attorney, Agent, or Firm*—Workman, Nydegger & Sealey

[57] ABSTRACT

To provide an expanded computer desktop working area, a forking driver is removably inserted logically between a graphical device interface program and a plurality of display device driver programs driving a plurality of computer monitor display screens. When inserted, the forking driver configures parameters for the screens to recognize capabilities common to the screens while also preserving significant capabilities of one of the screens representing a primary screen. The forking driver intercepts a function call directed to the device driver program corresponding to the primary screen and processes the function call to cause one or more of the device driver programs to change one or more screens in a manner consistent with the expanded working area.

26 Claims, 7 Drawing Sheets

ALLOCATING DISPLAY INFORMATION

BACKGROUND OF THE INVENTION

A typical personal computer system includes (FIG. 1) a computer monitor 6 having a computer screen 8 displaying information to an end-user of the system. Often, the information is displayed using a presentation "shell" program 10 having a graphical user interface ("GUI"). The shell program is provided by operating system software (e.g., Microsoft® Windows®95) running on the system. On the monitor's screen, the GUI provides one or more display windows, each defining a specific sub-area within the screen's entire display area, or encompassing the entire display area. The GUI allows the end-user or an application program 12 (e.g., a word-processing program) to create one or more display windows corresponding to one or more tasks. Once created, the display windows can be positioned at different parts of the computer screen by the application program or by the end-user manipulating an input device such as a computer mouse or a keyboard.

Figure 1:
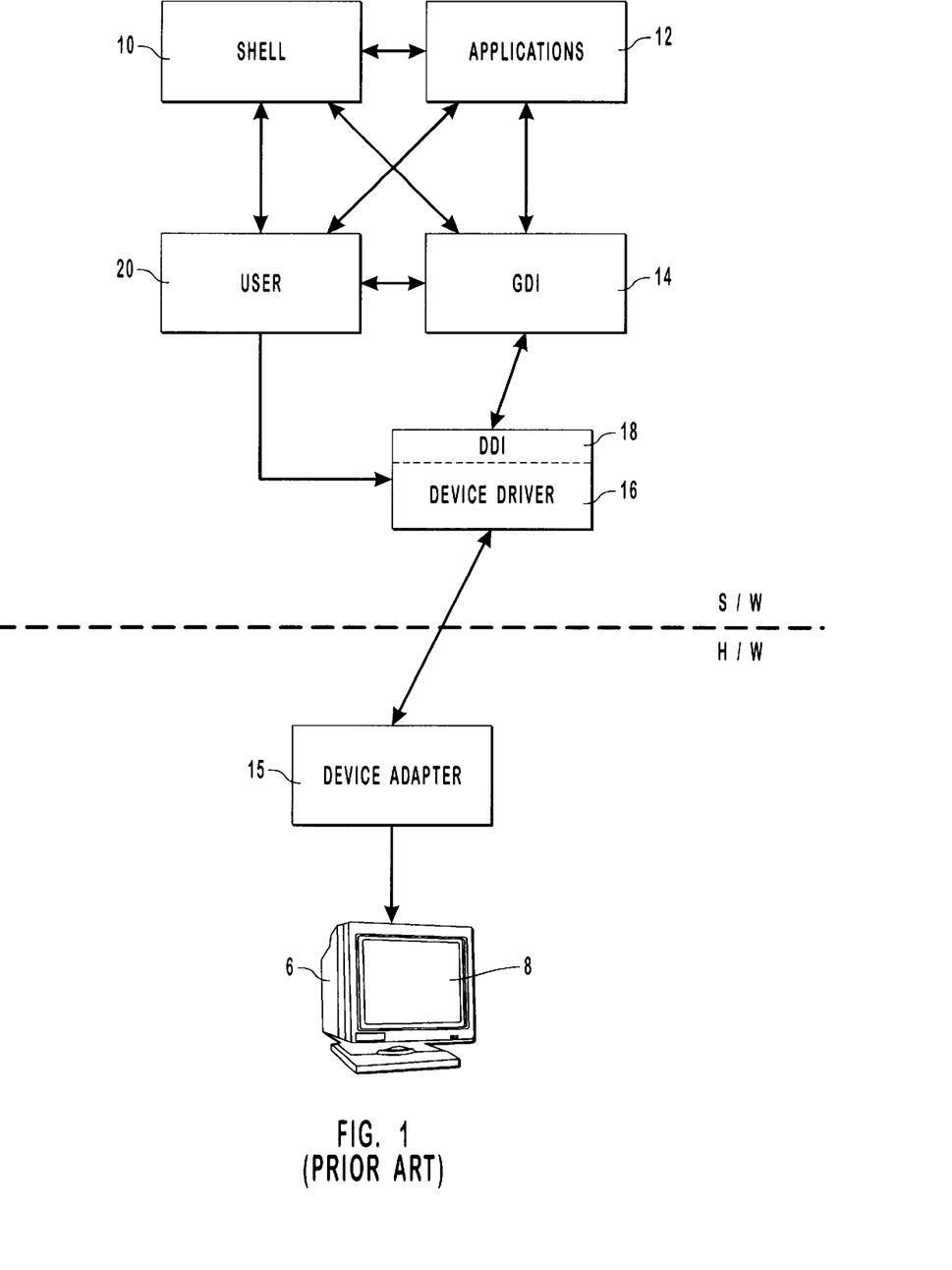
FIG. 1 is a block diagram of a computer system driving a screen provided by a computer monitor.

To display information in one or more of the display windows, an application program running on the system uses a graphical device interface subsystem 14 ("GDI") provided by the operating system. GDI serves as a link between the application program and a graphics device, such as a video display adapter 15 (e.g., a plug-in card) included with the computer to provide graphics output signals to the computer monitor. More particularly, GDI lies logically between the application program and a graphics device driver 16, which is a computer program designed to control a particular graphics hardware device such as the video display adapter. The device driver is not technically part of the operating system. Rather, the device driver is a software module (often provided by the vendor of the video display adapter) supplementing the operating system for updating the status of the video display adapter and the monitor in response to calls made to functions of the operating system in general and to functions of GDI in particular.

Communication between GDI and the device driver is facilitated by a device driver interface 18 ("DDI"). DDI is a set of functions provided by the device driver for access by GDI. Information is passed between GDI and the device driver through input and output parameters of these functions. Some of the functions are necessary for communication between GDI and DDI, while others are optional. GDI calls to an "Enable" function initialize the device driver and cause GDI to receive information about device-driver-supported DDI functions. GDI itself handles any operations not supported by the device driver. Most of the functions are exposed to GDI through an array of pointers residing in a pointer table.

GDI maintains important internal data structures and provides the device driver with access to public fields (i.e., externally-relevant fields) of these structures by passing the public fields as GDI/DDI software objects to the device driver. Thus, GDI/DDI software objects are intermediate data structures providing an interface between GDI data structures and a device driver needing access to information within the GDI data structures. A typical GDI/DDI software object provides information such as colors of a palette associated with the screen or definitions of brush objects for graphic functions that output lines, text, or fills. The device driver can pass a pointer to a GDI/DDI software object back to GDI to query for information or to request execution of various operations.

In response to application program originated function calls routed through GDI, the device driver ensures that the video display adapter produces the required output. I.e., in response to a request from an application, if GDI determines that a function relating to the request is supported by the device driver, GDI calls the function. It is the responsibility of the device driver to execute the function properly and return control to GDI upon completion of processing instructions associated with the function.

Typically, in response to calls to its DDI, the device driver updates the status of the video display adapter by changing the contents of memory and registers used by the adapter. The memory used by the adapter is referred to as "screen memory" or "frame buffer". What appears on the monitor's screen is controlled directly by the adapter and corresponds to the contents of the screen memory and the registers. The device driver also typically performs additional functions such as monochrome-to-color conversion of bitmaps, drawing of repetitive patterns in screen memory, and moving of an image from one portion of screen memory to another (referred to as a "bit block transfer" or "BitBlt"). Often, the operating system cannot perform these additional functions as quickly because, unlike the device driver, the operating system is not configured to take advantage of the video display adapter's particular characteristics and capabilities.

When an application or an operating system function needs to use a graphics hardware device such as the video display adapter, the application or function calls GDI's "CreateDC( )" function, via GDI's application programming interface ("API"), with a data string specifying the name of the device (e.g., "Display"). In response, a data structure known as a "device context" is created for the device. The device context reflects the current state of many attributes determining how GDI functions work on the device. Among the attributes specified in the device context are a text font (i.e., typeface), a text color, a background color behind text, and intercharacter spacing.

When CreateDC is called, GDI returns a handle ("hDC"), which is a pointer to the device context and which is used later by the application to interact with the device context by passing the handle to other GDI APIs. GDI also identifies a graphics device driver for the device specified by the data string (e.g., "Display") noted above. GDI then calls operating system functions to load the specified device driver. Once the device driver is loaded, GDI is able to communicate with the device through DDI functions. Via the device driver, GDI is able to perform actions such as initializing the device and drawing graphics on the screen of the monitor driven by the device. Multiple hDC's may exist for a single device, so that multiple application programs can cause graphics to be drawn on a single device. GDI handles the synchronization between the hDC's.

GDI has several hundred functions making up several broad groups. One group includes CreateDC( ) and other functions providing the operating system and application programs with the ability to control the existence of device contexts. Another group includes functions providing device context information such as the dimensions of a currently-selected font. Functions relating to displaying text or drawing graphics such as lines, filled areas, and bit-mapped images are included in another group. Still another group provides functions for setting and determining the status of device context attributes relating to details such as the color and justification of text. Functions of yet another group provide access to GDI objects, which are constructs such as logical pens and brushes, and which allow the setting of widths and styles of lines and other graphics drawn in the display windows on the screen.

The display windows appearing on the screen occupy a logical space known as the GUI "desktop." The desktop is an essentially two-dimensional working template area supporting various graphical objects, including the display windows. The screen of the monitor corresponds to at least a subset of the desktop. The operating system allows applications running on the computer to specify desktop object characteristics such as colors, font sizes, and output resolutions and the like without regard for the specific limitations of a particular video display adapter or monitor. GDI converts the application's specified characteristics to conform to the adapter's and monitor's limitations. For example, the application may specify a yellow color, but the adapter and monitor combination may be capable of displaying gray scales only. If so, GDI converts the yellow color to a gray scale.

When the operating system is started, the device context of the video display adapter is initialized by another operating system subsystem "USER". USER provides functions relating to the GUI, including functions to create, move, size, and remove screen objects such as display windows, selection menus appearing in the display windows, graphical icons, and the like. For example, an application program can call a USER function to remove a display window associated with the application program. USER also controls other resources such as a sound driver, a timer, and communications ports. In addition, end-user input from a mouse, a keyboard, or other input device is directed by USER to an application program.

Like GDI, USER is able to interact directly with the adapter's device driver. For example, in Windows®97, USER requires the device driver to provide cursor support directly, i.e., requires the device driver to make directly available some functions relating to displaying a mouse pointer (cursor). These functions include "CheckCursor" for drawing the cursor if drawing is not disabled, "InquireCursor" for retrieving information about the cursor, "MoveCursor" for moving the cursor to a specified position on the screen, and "SetCursor" for setting the cursor's shape. When the operating system first starts, USER calls the InquireCursor function to retrieve information about the cursor. USER then sets a system timer to call the CheckCursor function on each timer interrupt (i.e., at predetermined intervals) and starts a mouse-related device driver. As a result, whenever moved by the end-user, the mouse generates a hardware-based asynchronous interrupt causing the operating system to call MoveCursor. USER and application programs subsequently set the shape of the cursor using SetCursor. In this example, because USER calls MoveCursor at each mouse interrupt occurrence, MoveCursor sets a flag with a non-interruptable instruction (e.g., "bts") to prevent the MoveCursor function from being called again before completing processing of a current call. Once the flag is set, MoveCursor determines a new position (i.e., the x and y coordinates) and draws the cursor in the new position. When finished, MoveCursor clears the flag with another non-interruptable instruction. Meanwhile, the CheckCursor function is called at each timer interrupt to determine whether the cursor should be redrawn and whether drawing is enabled. If so, the function redraws the cursor.

After the device context is initialized, USER queries the device for several of its characteristics and capabilities so as to properly maintain the desktop. Initializing the device context provides USER with information about icons, key and mouse cursors, and bitmap resources for defining the appearance of other screen objects such as graphical buttons controlling the presence of a display window. Once initialized by USER, the device context typically remains fairly stable for the duration of the Windows® session, i.e., until the operating system is restarted for some reason.

In Windows®97, USER also supports reconfiguring the logical width and height of the screen during the Windows® session. The logical width and height are measured in pixels organized in a raster grid. A pixel refers to the smallest unit of the screen addressable via the screen memory and is usually represented in the screen memory by multiple bits representing the state of one or more characteristics (e.g., color) of the pixel. For example, the color of the pixel may be represented by 24 bits, i.e., a pixel's color may have a "bit-depth" of 24. In the case of a computer monitor employing cathode-ray tube ("CRT") technology, a pixel corresponds to a phosphor dot or a set of phosphor dots configured to illuminate when struck by one or more beams emanating from an electron gun.

Changing the logical height and width of the screen during a Windows® session is accomplished by instructing the device driver to direct the video display adapter to re-initialize itself with the new height and width. Assuming the adapter is capable of such a re-initialization, USER subsequently queries the adapter for its capabilities to update the adapter's device context. In Windows®97, USER also updates the positions on the screen of any of the desktop's display windows that are affected by the change. Typically, like the size of the screen, the size of a display window is measured in pixels. Thus, for example, if a screen originally having a size (i.e., resolution) of 1024 (width) by 768 (height) pixels is then changed to having a resolution of 640 by 480 pixels, one or more display windows that were originally completely visible may lie partially or completely offscreen after the change. Also, as a result of the change in resolution, a window originally sized to cover a considerable portion of the desktop may no longer fit on the screen. USER repositions any such windows, first by attempting to move those windows horizontally or vertically or both, and then, if unsuccessful, by resizing the windows to fit within the available desktop space.

GDI allows specially-designed application programs to make use of multiple screens corresponding to multiple monitors. As mentioned above, when an application program or an operating system subsystem is directed to change the appearance of graphics on the screen (i.e., to draw on the screen), the application or operating system obtains an hDC from GDI (unless the application has done so already) and issues drawing commands to that hDC. GDI then translates the drawing commands into a form understandable by a device driver associated with that particular hDC. Accordingly, GDI is able to handle multiple screens by providing different hDC's for each screen. More particularly, an application is thus able to draw on two screens by referring to two different hDC's. For example, a portable computer may be equipped with two video display adapters (i.e., the equivalent of two plug-in video cards), with one adapter driving a built-in liquid crystal display ("LCD") screen and the other adapter driving a CRT screen connected to the computer by a cable. So equipped, the portable computer can run a specially-designed application such as Microsoft® PowerPoint® for displaying on the CRT screen a presentation controlled according to configurable settings appearing in a display window on the LCD screen. Because in this case the CRT screen does not represent part of the desktop, an enduser can position neither a display window nor the operating system's mouse pointer on the CRT screen.

SUMMARY OF THE INVENTION

The invention is directed to a technique for allocating display information. Display information provided by a computer operating system subsystem or an application program is received by a graphical device interface program ("GDI") that normally calls functions of a device driver program to update a computer screen to reflect the display information. A forking driver is removably inserted logically between GDI and the device driver to allow the display information to be used to update more than one screen, thus allowing the operating system to provide a larger graphical user interface desktop area spanning more than one screen. The forking driver processes the display information to determine the screen or screens affected by the information, and then calls functions of corresponding device driver programs to update the screen or screens. When inserted, the forking driver acts as a virtual device driver having some capabilities common to all of the screens and other capabilities dictated by only one of the screens.

The invention provides several advantages. Without modification, application programs in a computer system can take advantage of additional screens providing an expanded graphical user interface desktop area. A second screen is added to a first screen without unnecessarily depriving the first screen of the first screen's significant capabilities. Changes made to accommodate the second screen may be undone without re-starting the computer system or an application program.

In general, in one aspect, the invention features a method of allocating display information among multiple display screens in a computer system, the method including identifying a first function provided by a first display device driver and a second function provided by a second display device driver, the functions and the device drivers configured to allow at least one of the display screens to be updated in accordance with the display information, the first function and the first driver corresponding to one of the screens, the second function and the second driver corresponding to another of the screens; replacing an original pointer to the first function with a redirection pointer; configuring a capability attribute, the configuration reflecting a capability common to both drivers; using the redirection pointer to redirect a function call including the display information, the function call originally directed to the first function; processing the display information to derive new display information in accordance with the configured capability attribute; and updating at least one of the screens by causing a new function call directed to one of the functions, the new function call including the new display information.

Implementations of this aspect of the invention may include one or more of the following features.

One of the drivers may be unable to use a color, a color palette, or a data construct usable by the other driver and the new information may include a new color, a new color palette, or a new data construct.

The method may further include configuring another capability attribute to reflect a predetermined configuration or a configuration appropriate for only one of the drivers regardless of whether the corresponding capability is common to both drivers. The method may further include re-instating the original pointer without shutting down the computer system or an application program.

The display information may include an original data construct configured for use by the first driver and the method may further include deriving from the original data construct a new data construct configured for use by the second driver. The new data construct may be re-derived before another use by the second driver.

Each driver may drive a computer display adapter configured to drive the corresponding screen.

The method may further include providing one of the drivers with an offset origin and providing coordinates to the one of the drivers for updating at least one of the display screens in accordance with the offset origin.

One of the screens may be a remote screen, the second driver may be a remote control device driver driving the remote screen, and the method may further include updating the remote screen to match another one of the screens.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 2:
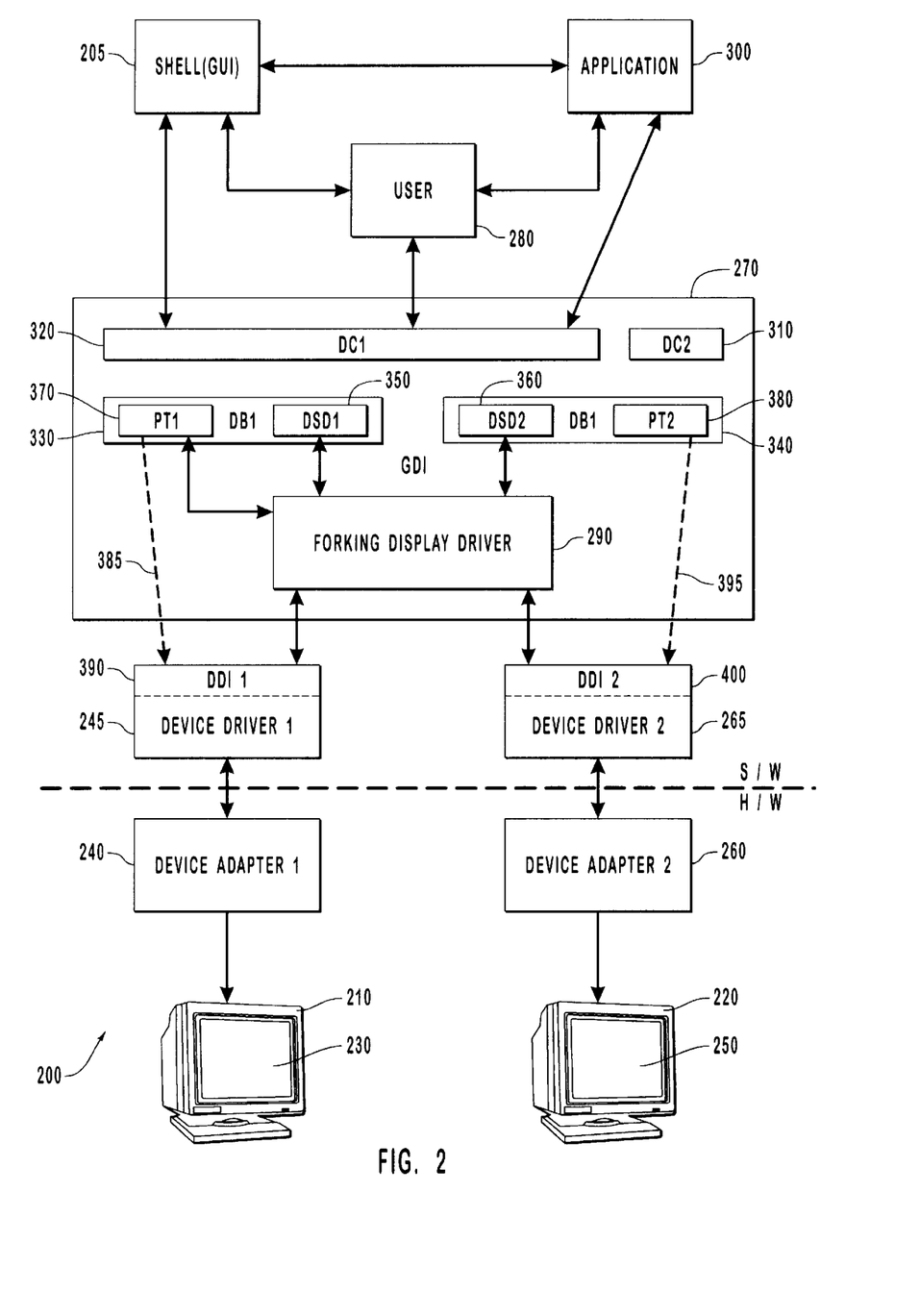
FIG. 2 is a block diagram of a computer system driving two screens provided by computer monitors.
Figure 3:
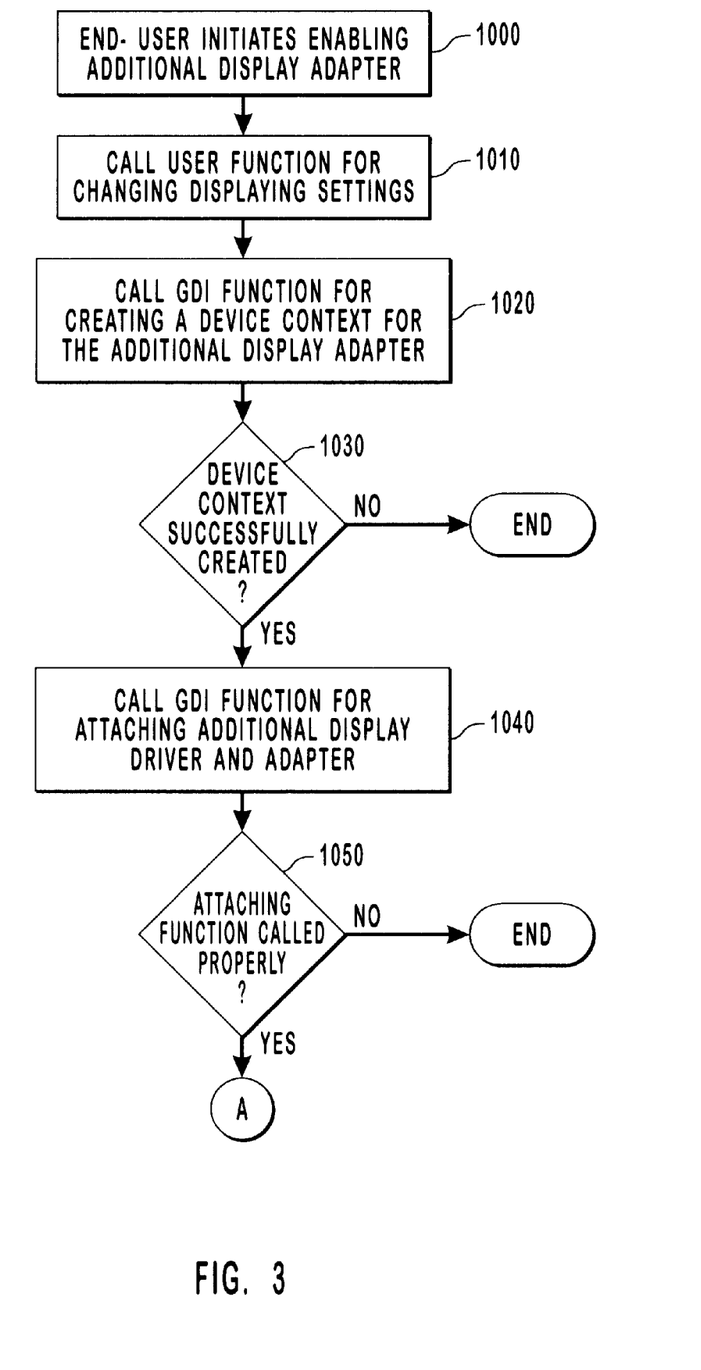
FIGS. 3–7 are flow diagrams of a process of configuring the computer system of FIG. 2.
Figure 4:
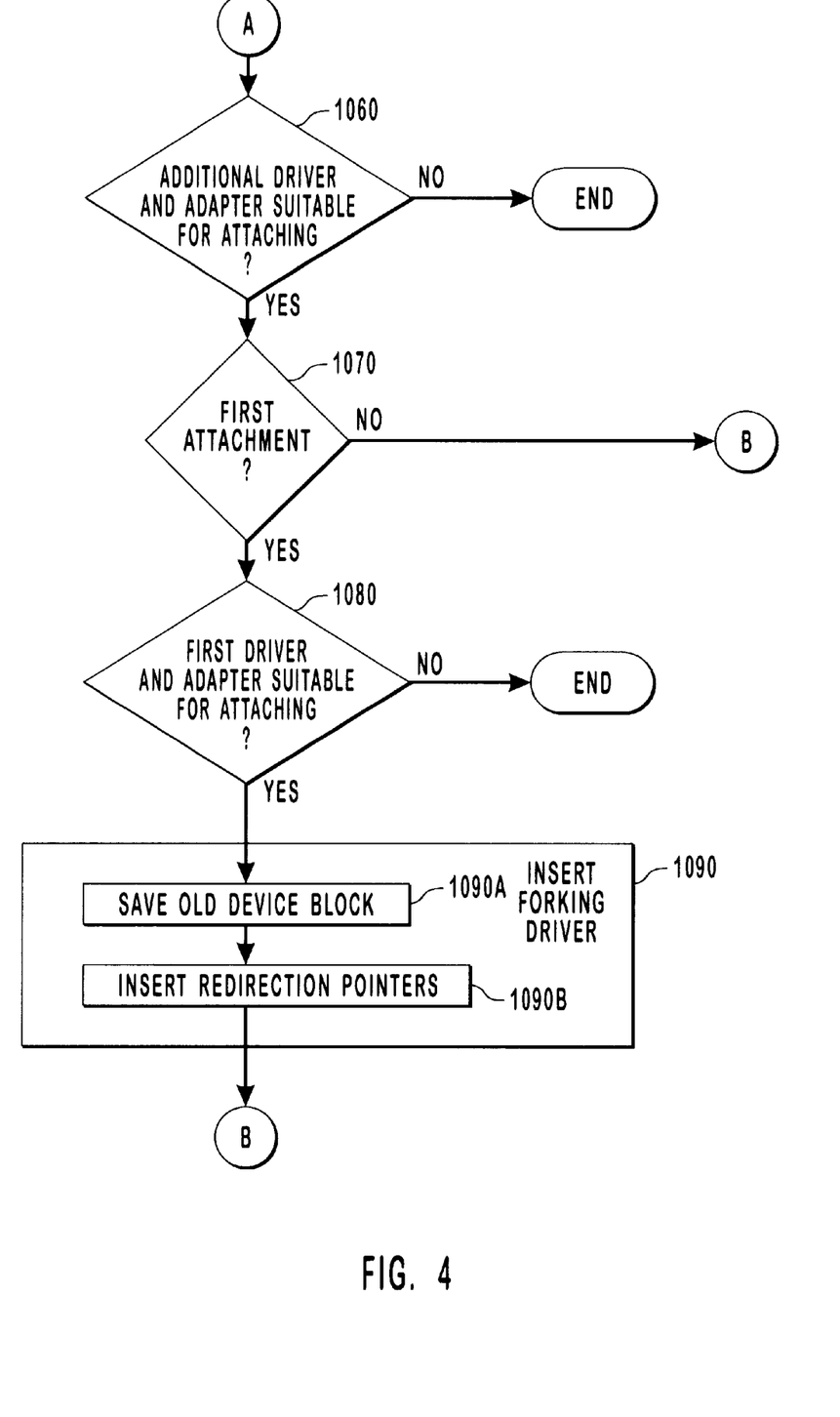
Figure 5:
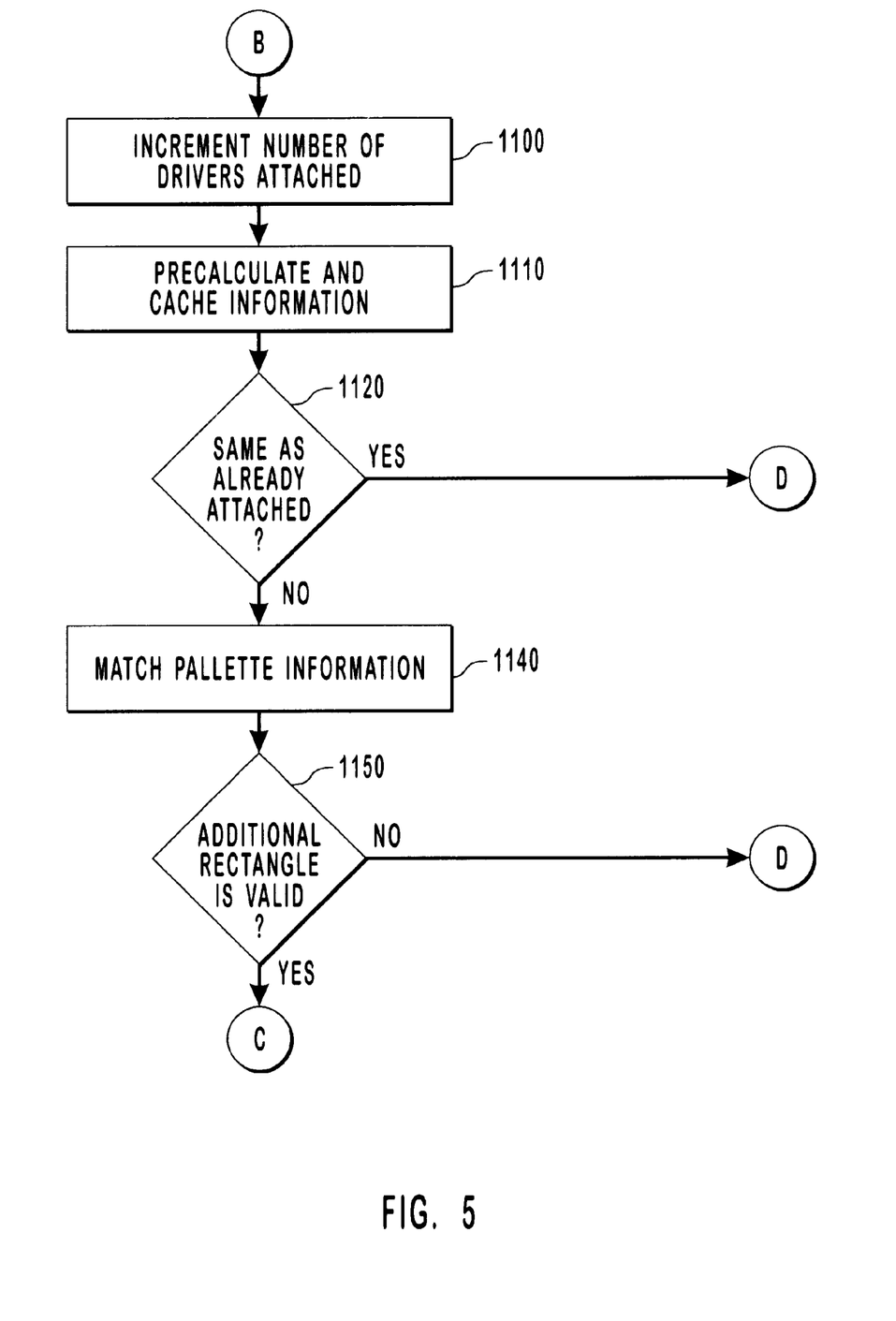
Figure 6:
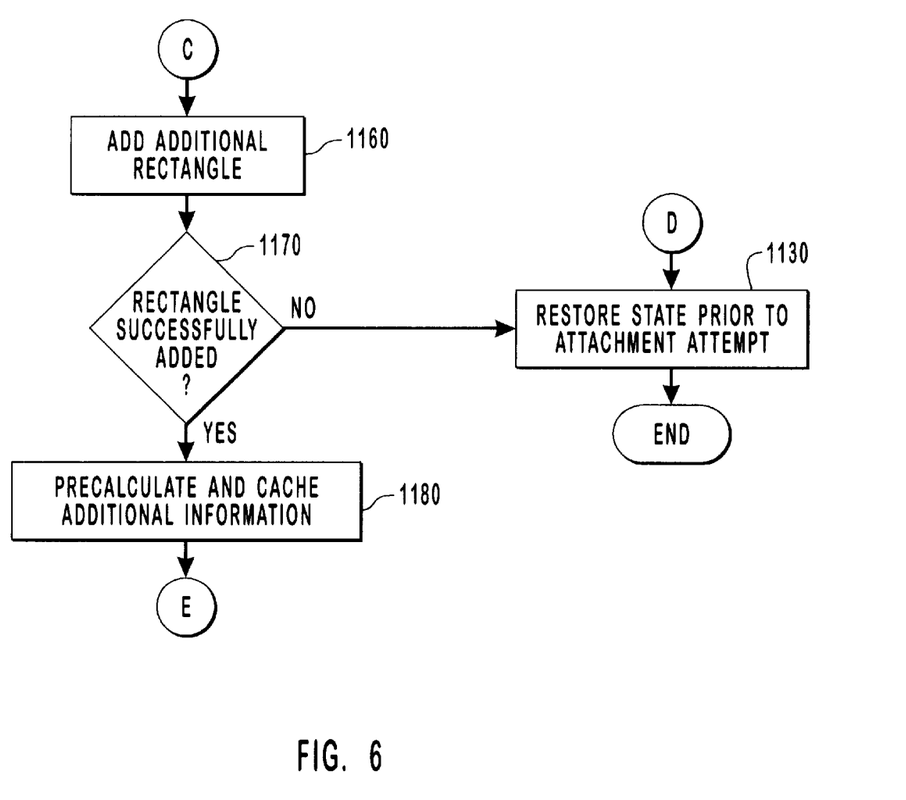
Figure 7:
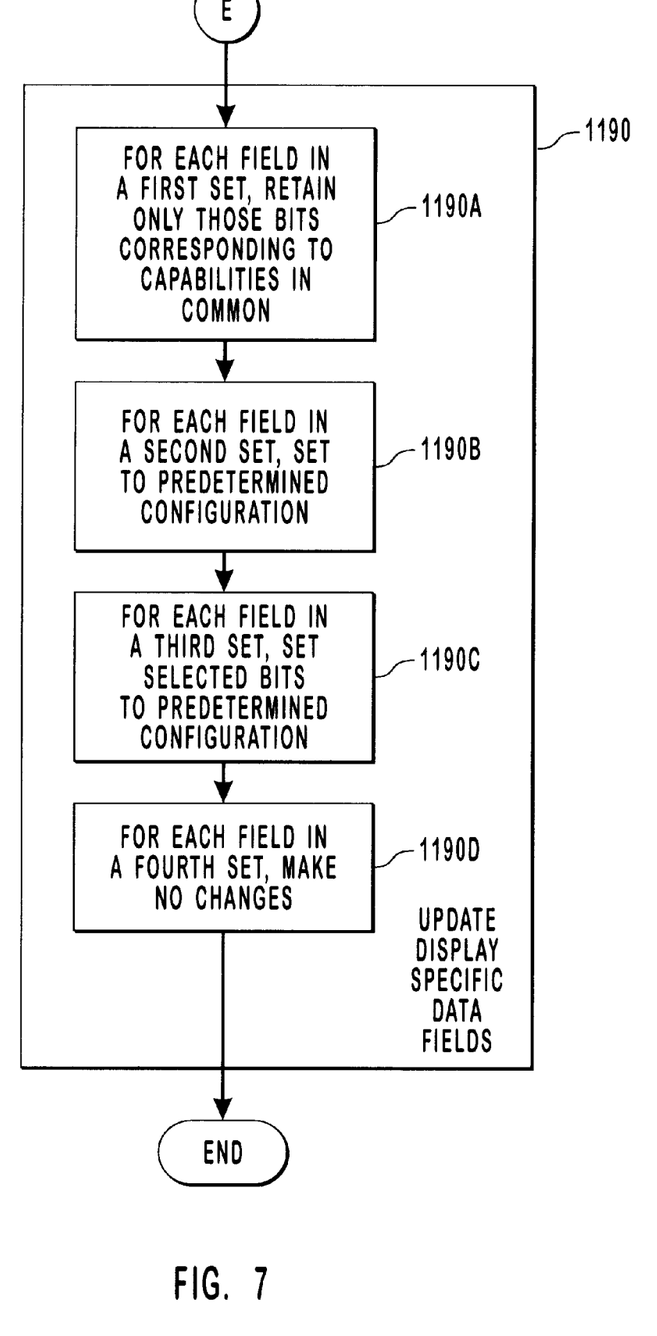

FIG. 2 illustrates a computer system 200 running an operating system ("OS") such as Microsoft® Windows®95 or Microsoft® Windows® NT™ for providing a graphical user interface ("GUI") to an end-user of the computer system. Such operating systems are described in the Microsoft® Development Library (July 1996) and in Charles Petzold & Paul Yao, Programming Windows®95 (Microsoft® Press 1996), both incorporated herein by reference. To provide the GUI, an OS subsystem program referred to as "shell" 205 operates through other programs to control a first monitor 210 having a first screen 230 and a second monitor 220 having a second screen 250. The first screen is driven by a first device adapter 240 paired with a first device driver program 245. Similarly, a second device adapter 260 is paired with a second device driver program 265 to drive the second screen 250. Additional screens may be added and are driven similarly. The shell is linked to the device drivers by a graphical device interface program 270 ("GDI") and another OS subsystem program referred to as "USER" 280. It is to be understood that the first device adapter and the second device adapter need not be identical and in fact may be made up of different hardware components and may originate from different vendors.

Provided with GDI is a forking display driver 290 for allocating display information between two or more screens, as described in detail below. Specifics of the following description are directed primarily to such a forking display driver for use in a case where the computer system runs the Microsoft® Windows®95 operating system; however, the principles involved apply as well to where the computer system 200 runs another operating system such as Microsoft® Windows® NT™ instead.

The display information to be allocated is provided by the shell, USER, or one or more application programs 300 and includes information providing instructions for making changes to the contents of one or more of the screens. To minimize any compatibility problems when only one screen is available in the system, the forking driver becomes active only when two or more screens are enabled, as described below. Once active, the forking driver allows expansion of the GUI's desktop (i.e., a two-dimensional working space provided by the GUI) to span the two screens. An end-user is then able to move the GUI's mouse cursor, display windows, and other screen objects across the two screens in much the same way as the objects are normally moved within one screen. Additional information is provided in commonly-assigned U.S. Ser. No. 08/786,969, entitled "ROBUST DISPLAY MANAGEMENT IN A MULTIPLE MONITOR ENVIRONMENT," which is incorporated herein by reference. The forking driver is returned automatically to an inactive state if the end-user disables all additional screens, leaving only the first screen enabled.

As described in more detail below, when the enduser instructs the system to make the second screen a part of the desktop, GDI executes a process referred to as "attachment" for associating the second screen with the first screen. Each screen corresponds to a pointer ("hDC") to a data structure ("device context") providing OS subsystems and applications with access to the screen. The device context also provides information about the capabilities of the screen and the device adapter driving the screen. In the attachment process, the forking driver is activated, providing the OS subsystems and applications with the ability to use one hDC for both screens, i.e., to treat the screens as one screen.

Disposed logically between the hDC and the device drivers, the forking driver controls communication with the device drivers. The forking driver works with multiple display adapters of potentially differing capabilities to produce a single virtual adapter having one set of capabilities available to an OS subsystem or an application. The capabilities of the first adapter are retained wherever possible. For example, when a second display adapter having a color bit-depth of 16 is attached to a first display adapter having a bit-depth of 8, the bit-depth of 8 is retained for GDI and therefore also for the application. Exceptions occur in various cases including where the second adapter lacks support for a capability of the first adapter and the capability is difficult to simulate on the second adapter, and also where the resulting capability is an enhancement over the adapters' individual capabilities. For example, a capability known as "valid surface area"(corresponding to the GUI desktop) is expanded by an amount equal to the valid surface area of the second adapter. The resulting valid surface may no longer be rectangular, leading to additional complexity, but the complexity is handled by existing complex clipping functions of GDI. Additional information is provided in commonly-assigned U.S. Ser. No. 08/786,972, entitled "LOGICAL MONITOR CONFIGURATION IN A MULTIPLE MONITOR ENVIRONMENT," which is incorporated herein by reference.

When display information such as a drawing instruction is issued by an OS subsystem or an application to a first hDC, GDI transforms the information into a form dictated by the capabilities now supported by the forking driver. GDI then passes the information to the forking driver. As described below, the forking driver examines the information, determines which adapters are affected, and causes modifications to the information before passing the information on to the device drivers. Such modifications include converting coordinates for the expanded valid surface area into coordinates for each adapter's individual area, clipping the information to the individual areas, and converting colors having the format of the first adapter into the format of the second and other additional adapters. Similarly, data structures known as "device dependent bitmaps" ("DDBs") are provided in the format of the first adapter and are converted before presentation to the second adapter. The conversion is performed at the direction of the forking driver by a Windows®95-provided universal display device driver program known as a "device independent bitmap (DIB) engine". It is to be noted that in the case of a forking driver for Windows® NT™, what is performed by the DIB engine in Windows®95 is performed by GDI itself instead.

Other structures, including logical objects such as pens, brushes, fonts, and palettes, are provided in a format independent of any one particular adapter or monitor. When one of these logical objects is selected, GDI provides the forking driver with a corresponding "physical" object configured for display using the first adapter and first screen. As described below, the forking driver then causes creation of a physical object specific to each particular adapter and screen affected. To conserve memory and processing resources, such physical objects are created "on the fly" as needed and are then saved for possible future use.

With reference to FIGS. 2–7, the end-user initiates a process of enabling (i.e., attaching) an additional display adapter (e.g., the second adapter 260 mentioned above) by running a subprogram known as "Control Panel—Display" (step 1000). Provided by the Windows® "shell"subsystem 205, "Control Panel—Display" allows the end-user to select a color bit-depth, a resolution, and a logical position for an additional screen (e.g., the second screen 250 mentioned above) corresponding to the second adapter. The additional screen's logical position is determined relative to the logical position of the first screen 230. All of these selections by the end-user may be changed dynamically later.

"Control Panel—Display" then calls a "ChangeDisplaySettings( )" function of the Windows® USER subsystem 280 (step 1010). In turn, "ChangeDisplaySettings( )" calls a GDI function "CreateDC( )"for creating an additional device context 310 for the additional screen and returning an additional pointer "hDC"for this context 310 (step 1020). Note that for the first screen there is an already-existing hDC pointing to an already-existing device context 320 created when the operating system was started. Commonly used by applications for performing graphics operations, the device context encapsulates all of the graphics information about the additional adapter. The graphics information includes attributes such as color bit-depth, size in pixels, resolution in dots per inch or centimeter, current position for insertion of text, current text font selected, current brush selected, and current pen selected.

Next, it is determined whether "CreateDC( )" has been successful (step 1030). Success indicates that GDI was able to load and run a device driver (e.g., the second device driver 265) for the additional adapter and that the device driver confirmed interoperability with the adapter. When loading the additional device driver, GDI notifies the device driver of the device driver's status as not the first device driver. Depending on the particular characteristics of the device driver and its associated adapter, such notification may be necessary to allow the device driver and adapter to function properly in conjunction with the first device driver and adapter.

If "CreateDC( )" fails, the process of enabling the additional adapter is terminated. The end-user may restart the process after the cause of the failure is addressed.

However, if "CreateDC( )" succeeds, another GDI function "AttachDC( )" is called for attaching the additional device driver and adapter (step 1040). The "AttachDC( )" function takes four parameters: the already-existing hDC corresponding to the first adapter and screen, the additional hDC corresponding to the second adapter and screen, a flag indicating attachment is in progress, and a rectangle data construct specifying the relative position of the second screen to the first. The already-existing device context is referred to hereafter as a "virtual device context" because after this point the already-existing device context represents more than one screen. Multiple screens can be attached by calling "AttachDC( )" multiple times. In addition, as described below with respect to a forking driver for Windows® NT™, for example, the forking driver may allow multiple virtual device contexts, each representing multiple screens. For instance, in a Windows® NT™M-based computer system having ten screens, a first of two resident virtual device contexts may correspond to a first desktop area made up of four of the screens, while a second of the two resident virtual device contexts may correspond to a second desktop area made up of the remaining six screens.

Next, it is determined whether "AttachDC( )" has been called properly (step 1050). In addition to the attachment-in-progress flag noted above, "AttachDC( )" has a removal-in-process flag used during removal of an additional screen, as described below. "AttachDC( )" is called properly if: only one of the two flags has been set, the rectangle construct indicates a valid relative position, the first hDC provided points to a device context for the first screen, and the second hDC provided does not point to the first screen. If "AttachDC( )" has been called improperly, the process of enabling the additional adapter is terminated.

Otherwise, it is also determined whether the additional device driver and adapter are suitable for attachment (step 1060). First, the device driver should be a DIBENGINE-compatible device driver. DIBENGINE is a specification associated with the DIB engine. The DIB engine provides built-in functions for drawing. DIBENGINE compatibility is specified here to allow use of a function "BitBlt( )" for copying graphics across multiple screens without involving each screen's individual device driver. Second, the adapter should be raster-based, as opposed to vector-based. Lastly, the adapter should use a Windows®compatible bitmap format. If the device driver or adapter is determined to be unsuitable, the process of enabling the additional adapter is terminated.

Assuming the additional device driver and adapter are suitable for attachment, it is then determined whether the additional device driver and adapter would be the first to be attached to the first device driver and adapter (step 1070). If so, the forking driver has yet to be inserted. However, before insertion of the forking driver, a suitability determination similar to that described above is applied to the first device driver and adapter to confirm suitability for receiving an attachment (step 1080). The suitability determination also checks to make sure that the device driver and adapter indicated by the hDC are indeed the first device driver and adapter. Again, if the device driver or adapter is determined to be unsuitable, the process of enabling the additional adapter is terminated.

Otherwise, the forking driver is inserted (step 1090). The insertion process uses GDI data structures referred to as "device blocks" 330, 340. The virtual device context 320 points to the first device block 330 and the additional device context 310 points to the second device block 340. Each device block has a set of fields of information 350, 360 ("device specific data (DSD) fields") specifying attributes such as color bit-depth, size in pixels, and a subset of colors (i.e., a palette) selected for the respective adapter. In addition, each device block has a pointer table 370, 380. As shown with a dashed line 385, the first pointer table 370 normally has pointers pointing to a set of functions 390 ("device driver interface" or "DDI") provided by the first device driver 245. Likewise, as shown with another dashed line 395, the second pointer table 380 normally has pointers pointing to a DDI 400 provided by the second device driver. The pointers are used by GDI for instructing the device driver in response to function calls made to GDI by applications and OS subsystems.

The forking driver is inserted by saving a copy of the first device block, including the DSD fields and the pointer table (step 1090A), and then inserting redirection pointers in the first pointer table to replace the pointers pointing to the first DDI (step 1090B). Inserting the redirection pointers causes the first pointer table to point to the forking driver instead of to the DDI. Thus, the forking driver is able to intercept attempts by GDI to instruct the first device driver. For example, GDI may attempt to call a DDI function such as "BitBlt( )" for copying one portion of the expanded valid surface area to another portion. If so, the forking driver intercepts the function call, determines which screen or screens are affected, and causes execution of the copying by calling one or more functions of the first DDI or the second DDI or both. As described below, the copy of the first device block is saved to allow an efficient return to the use of a single screen should the end-user elect to remove all additional screens. In a case involving only one virtual device context, the copy may be stored in data structures known as global variables. It is to be noted that in the case of a forking driver for Windows® NT™, for example, multiple virtual device contexts may be used in the computer system, in which case such data structures are not stored as global variables by each virtual device driver. In addition in the case of a forking driver for Windows® NT™, each device driver may control multiple device driver instances, each device driver instance driving a different screen.

Note that each adapter and screen remains available for individual access even after such attachment is executed; such attachment does not block the OS or an application program from treating each adapter and screen as separate. For each adapter and screen, such individual access may be achieved by creating and retaining a separate additional device context that is not attached. The OS or application program is then able to use the separate additional device context to treat the adapter and screen as separate, i.e., as unattached. Such individual access may be useful in a case such as where the application program is a high-end desktop publishing program requiring sufficient control over one of the screens to allow for color correction of the screen in situations where color accuracy is important.

It is to be noted that in the case of a forking driver for Windows® NT™, for example, a newly-created device context is used instead of the already-existing device context. In such a case, the newly-created device context, not the already-existing device context, is used as the virtual device context to represent more than one screen.

Next after the forking driver is inserted, a count tracking the number of device drivers and adapters attached is incremented (step 1100). Information expected to be used often by the inserted forking driver is then precalculated and cached in additional global variables for efficient access (step 1110). (Again, as noted above, global variables are preferably not used in the case of a forking driver for Windows® NT™ where multiple virtual device drivers may be used.) Such information includes, for example, information about whether one or both of the now-attached adapters makes use of a palette, whether the adapters use the same color bit-depth and color format, and whether the additional device driver is able to use the same DIBENGINE-based objects such as pens and brushes created specifically for use with the first device driver.

Additionally, it is determined whether the additional device driver and adapter are the same as a device driver and adapter already attached to the first device driver and adapter (step 1120). If so, the state prior to the attachment attempt is restored (step 1130) and the attachment process terminates.

Otherwise, palette information for the device drivers and adapters is then matched (step 1140). In the embodiment presently described, if the first device driver and adapter combination uses a color bit-depth of 8 and a particular palette, that palette is also used by all attached additional device driver and adapter combinations configured to employ a color bit-depth of 8 and a palette. Such use eases compatibility with older application programs, but is not necessary; other embodiments may allow the use of different palettes. To match the palette information, the DSD fields of the second device block are set to reflect use of the same palette used by the first device driver and adapter. In addition, to ensure synchronization of the first and second device driver and adapter combinations, a palette translate bit and a palette translate table are copied from the first DSD fields to the second DSD fields. The translate bit and the translate table are used in drawing bitmapped images in background display windows using palettes that are different from the palette used by a foreground display window. Because the foreground display window controls the palette used, copying the translate bit and the translate table allows the background to be displayed as accurately as possible. In addition, a patch is made to ensure that the DIB engine behaves properly with respect to multiple device driver and adapter combinations using palettes. To determine whether two individually selected palettes are in fact the same palette, the DIB engine compares pointers to the palettes, instead of comparing the palettes directly. Therefore, for each additional device driver and adapter combination, a corresponding pointer known as "deBitmapInfo" in a data structure LPDIBENGINE is patched to match the deBitmapInfo pointer corresponding to the first device driver and adapter combination.

Next, it is determined whether the additional device driver and adapter combination's rectangle data construct is valid (step 1150). As noted above, the rectangle data construct specifies the relative position of the second screen to the first screen. The rectangle data construct is determined to be valid if the rectangle data construct does not intersect another rectangle corresponding to another device driver and adapter combination. If the rectangle data construct is determined to be invalid, the state prior to the attachment attempt is restored (step 1130) and the attachment process terminates. However, it is to be noted that in the case of a forking driver for Windows® NT™, for example, the rectangle data construct remains valid even if the rectangle data construct does intersect another rectangle corresponding to another device driver and adapter combination. In such a case, for example, the rectangle data construct may describe a remote control rectangle corresponding to a remote control device driver and a remote screen. The remote control device driver may be provided by remote control application software driving the remote screen connected to the computer system across a remote data connection such as a telephone line modem link. If so, the remote control rectangle may fully intersect another rectangle corresponding to a local device driver and adapter combination. Such full intersection eases the remote control application software's ability to show on the remote screen a copy of what appears on a local screen driven by the local device driver and adapter combination. In essence, such full intersection allows any change made to the local screen by the local device driver to be made at the same time to the remote screen by the remote control device driver.

If the rectangle data construct is determined to be valid, the rectangle data construct is added to a GDI general purpose data structure known as a "global region" (step 1160), i.e., a region encompassing all of the computer system's screens used to provide the computer system's desktop area. (As noted above with respect to global variables, the region need not be global, especially in the case of a forking driver for Windows® NT™ where multiple virtual device drivers may be used.) The global region is used to keep track of the shape of the virtual device context's enhanced valid surface area as device driver and adapter combinations are added. Next, it is determined whether adding the rectangle data construct was successful (step 1170). Adding the rectangle data construct is expected to succeed unless a memory allocation error occurs. If such an error occurs, the state prior to the attachment attempt is restored (step 1130) and the attachment process terminates.

If there is no error, additional information is precalculated and cached (step 1180). Such information includes whether all of the now-attached device driver and adapter combinations use the same color bit-depths and color formats and whether any of the device driver and adapter combinations uses a palette.

Finally, the DSD fields of the first device block are updated to produce DSD fields suitable for representing the capabilities of the enhanced valid surface area (step 1190). The DSD fields are grouped into four sets, not necessarily non-overlapping, with each set receiving different treatment. The first set includes fields dpCapsFE (indicating an adapter's ability to display various non-Arabic character sets), dpCurves (indicating an adapter's ability to draw various types of curves and curved objects), dpLines (indicating an adapter's ability to draw various types of lines), dpText (indicating an adapter's ability to draw various types of text), and dpRaster (indicating an adapter's ability to display bitmap data constructs). For this first set, a "lowest common denominator" approach is employed in which the only bits retained in each field are those bits representing capabilities common to all of the attached device drivers and adapters (step 1190A).

In the second set, each field is set to a predetermined configuration (step 1190B). In particular, a field known as dpPolygonals is set to a value referred to as PC_SCANLINE to turn off particular polygonal capabilities. Region level clipping capabilities are also turned off by setting a field known as dpClip to a value known as CP_RECTANGLE. Furthermore, a field known as dpNumFonts is set to zero to prevent the attached device drivers and adapters from using built-in fonts. Built-in fonts are expected to be unnecessary for display adapters because Windows® provides scalable, anti-aliased fonts.

Predetermined configurations are also used for selected bits in fields of the third set (step 1190C). If an RC_PALETTE bit is already set in the DSD fields for the first device driver and adapter, the RC_PALETTE bit is retained. Retaining the RC_PALETTE bit is appropriate in such a case because the DSD fields should reflect the use of a palette even if only the first device driver and adapter are configured to use a palette. Also, in the embodiment presently described, a dpLines field bit known as LC_POLYSCANLINE is cleared to prevent particular function calls relating to single scanlines and multi-scanline calls. However, in another embodiment configured to allow such calls to the attached device driver and adapter combinations, the LC_POLYSCANLINE bit need not be cleared.

Next to be set are the bits of a field known as dpcaps1, representing a collection of capabilities. The following dpcaps1 bits are set to match their original settings according to the first device driver and adapter: C1_GLYPH_INDEX, C1_BIT_PACKED, C1_BYTE_PACKED, C1_GAMMA_RAMP, C1_1CM, CL_CMYK _ABLE, and C1_SLOW_CARD. The first three bits are font related and are intended to optimize a font format sent to a device driver. Because the DIB engine is expected to handle all formats, for simplicity the settings indicate use of the format of the first device driver and adapter.

The next three bits relate to a device independent color feature. Because handling these bits is possible but difficult, these bits are simply set according to the first device driver and adapter. With respect to device independent color, applications are expected to support this feature directly.

The C1_SLOW_CARD bit is an indicator to USER about how to paint according to the speed of a display adapter. Because adding a new display adapter does not affect the speed of the first adapter, the C1_SLOW_CARD bit is left intact.

The rest of the dpCaps1 bits are set according to the lowest common denominator approach described above.

Finally, all remaining DSD fields fall into the fourth set and are left unchanged (step 1190D). At this point, attachment of the additional device driver and adapter is complete.

As mentioned above, the end-user may also initiate a process of removing a device driver and adapter previously attached. The removal process is essentially the reverse of the attachment process. The function AttachDC( ) is called with a removal-in-progress flag set as mentioned above. Next, the device driver and adapter indicated for removal are checked to confirm that the device driver and adapter combination is indeed attached and available for removal. The DIB engine deBitmapInfo pointer is then restored and the count of attached device driver and adapter combinations is decremented. A rectangle data construct is then subtracted from GDI's global region. If the device driver and adapter combination being removed are not the last additional device driver and adapter, the additional precalculated information mentioned above is re-calculated to remain current. Otherwise, the copy of the first device block is reinstated, eliminating the pointers to the forking driver and restoring the original DSD fields.

As noted above, when the forking driver is active, function calls directed to a DDI function are intercepted by the forking driver. Described below are examples of how the forking driver handles particular DDI calls. Other DDI calls are handled similarly.

If the first device driver and adapter combination is configured to use a palette, a DDI function known as "SetPalette( )" is called by GDI when GDI has occasion to change the palette used. When the forking driver receives a SetPalette( ) function call, the forking driver passes the call to each attached device driver configured to use a palette. For example, if there are a total of two device driver and adapter combinations and both are configured to use a palette, the forking driver passes the SetPalette( ) function call on to both device drivers.

Another DDI function known as "Realizeobject( )" allows a device driver to create a representation (i.e., a physical object version) of a logical object such as a pen, a brush, or a font. For example, a pen object has properties such as color, width, and style. The physical pen object has these properties but likely has the color property stored in a way that is optimized for the particular format of the adapter associated with the device driver. Therefore, the same physical pen cannot be used with any non-identical attached device driver and adapter combinations without a loss of information. For each logical object, GDI keeps a list of physical objects wherein each physical object is identified according to the device driver and adapter combination corresponding to the device driver. When the forking driver receives a RealizeObject( ) DDI function call, the forking driver simply calls the primary display's RealizeObject( ) function. Alternatively, a physical object may be created and stored for each device driver and adapter combination. As mentioned above, in this embodiment, memory and processing resources are conserved by creating such physical objects "on the fly" as needed. As a result, if a function call is received for drawing a rectangle and the rectangle is to be drawn on a screen other than the first screen, a logical pen object is recovered based on the physical pen object provided by GDI. Next, based on the logical pen object, it is determined whether a physical pen object has been created for the screen other than the first screen. If so, the physical pen object is used. If not, the forking driver creates the physical pen object for use.

In another example, GDI calls a DDI shape-drawing function known as "Output". If GDI provides a parameter referred to as OS_RECTANGLE, Output is expected to draw a rectangle, either on a screen or in a bitmap data construct. After receiving an Output function call, the forking driver first determines whether the call is directed to a screen or a bitmap data construct. The determination uses an Output call parameter indicating the device driver to which the call is directed. If the parameter matches a pointer known as "LPDIBENGINE/PDevice", the forking driver determines that the call is directed to a screen. Otherwise, it is determined that the call is directed to a bitmap data construct. If so, because the bitmap data construct is a physical object formatted for the first screen, the forking driver finishes processing the call by passing the call to the first device driver.

However, if the call is determined to be directed to a screen, the forking driver does not pass the call to the first device driver at this point. Instead, the forking driver computes a bounding box for the shape to be drawn. In this case involving drawing a rectangle, the bounding box is rectangular with dimensions matching the rectangle to be drawn. Next, the forking driver executes a process amounting to intersecting an optional parameter known as a clipping rectangle with the rectangle to be drawn. The clipping rectangle is designated in the function call to restrict the effect of the function call to a specified area of a screen. The forking driver checks one-by-one all of the screens making up the enhanced valid surface area to determine for each screen whether the clipping rectangle intersects the screen. For each screen so intersected, the forking driver then proceeds as follows. If the color bitdepth and color format attributes of the first screen do not exactly match those of the intersected screen, the forking driver updates all colors and objects associated with the function call. Drawing rectangles may involve both a pen and a brush as physical objects, which are provided in a format appropriate for the first screen but not necessarily appropriate for the intersected screen. For each physical object provided, a logical object is retrieved for producing an appropriately-formatted physical object, as described in a previous example above. Brush physical objects may use foreground and background colors provided in a data structure referred to as "DRAWMODE" and provided as another parameter in the function call. The DRAWMODE data structure stores both logical and physical colors. The forking driver temporarily patches the physical colors to provide colors appropriate for the intersected screen.

Normally, when a device driver receives drawing coordinates, the coordinates are expected to be relative to the adapter and the screen associated with the device driver. Therefore, the forking driver receives coordinates relative to the first screen. To reset the rectangle's coordinates for use by the device driver for the intersected screen, the forking driver offsets the coordinates by the origin of the intersected screen. If a clipping rectangle is provided as mentioned above, the clipping rectangle's coordinates are also offset. It is important to note that the device driver for the intersected screen expects to receive from GDI a completely valid clipping rectangle. Therefore, the clipping rectangle is then intersected with the intersected screen in case only a portion of the restricted drawing area appears on the intersected screen. Next, the device driver for the intersected screen is called with the Output function. Before handling the next intersected screen, the forking driver restores the DRAWMODE data structure and the physical objects. It is to be noted that in the case of a forking driver for Windows® NT™, for example, the forking driver may accomplish such offsetting of the coordinates by providing the intersected screen's device driver with an offset origin initially instead of offsetting coordinates as the coordinates are received. As a result, a performance gain is achieved, because providing the offset origin saves the processing time involved in offsetting of the coordinates as the coordinates are received. However, providing the offset origin to the device driver requires using a device driver able to accept such an offset origin, i.e., requires using a device driver specifically configured for operation in a computer system having multiple screens.

Other embodiments are within the scope of the following claims. For example, a screen being attached may be provided by any type of computer display hardware, including a liquid-crystal display or another flat-panel display. Also, the screen may be connected to the computer across a data connection such as a modem connection or a network connection. The forking driver may be provided resident to the operating system or may be provided as a add-on utility. In addition, the forking driver may be configured for use with a non-Windows® operating system such as UNIX® or OS/2®. Each adapter may be provided as an individual circuit board or semiconductor package provided mainly for display purposes or as a built-in portion of a multi-purpose circuit board (e.g., a computer motherboard) or semiconductor package carrying circuits for other functions as well.

What is claimed is:

1. A method of allocating display information among a plurality of display screens in a computer system, the method comprising:

identifying a first function provided by a first display device driver and a second function provided by a second display device driver, the functions and the device drivers configured to allow at least one of the display screens to be updated in accordance with the display information, the first function and the first driver corresponding to one of the screens, the second function and the second driver corresponding to another of the screens;

replacing an original pointer to the first function with a redirection pointer;

configuring a capability attribute, the configuration reflecting a capability common to both drivers;

using the redirection pointer to redirect a function call comprising the display information, the function call originally directed to the first function;

processing the display information to derive new display information in accordance with the configured capability attribute; and updating at least one of the screens by causing a new function call directed to one of the functions, the new function call comprising the new display information.

2. The method of claim 1, wherein one of the drivers is unable to use a color usable by the other driver and the new information comprises a new color.

3. The method of claim 1, wherein one of the drivers is unable to use a color palette usable by the other driver and the new information comprises information regarding a new color palette.

4. The method of claim 1, wherein one of the drivers is unable to use a data construct configured for use by the other driver and the new information comprises information regarding a new data construct.

5. The method of claim 1, wherein the method further comprises configuring another capability attribute to reflect a predetermined configuration regardless of whether the corresponding capability is common to both drivers.

6. The method of claim 1, wherein the method further comprises configuring another capability attribute to reflect a configuration appropriate for one of the drivers regardless of whether the corresponding capability is common to both drivers.

7. The method of claim 1, wherein each driver drives a computer display adapter configured to drive the corresponding screen.

8. The method of claim 1, wherein the method further comprises re-instating the original pointer to the first function without shutting down the computer system.

9. The method of claim 1, wherein the method further comprises re-instating the original pointer to the first function without shutting down an application program.

10. The method of claim 1, wherein the display information comprises an original data construct configured for use by the first driver; and the method further comprises deriving from the original data construct a new data construct configured for use by the second driver.

11. The method of claim 10, wherein the method further comprises re-deriving the new data construct before another use by the second driver.

12. The method of claim 1, wherein the method further comprises providing one of the drivers with an offset origin; and providing coordinates to the one of the drivers for updating at least one of the display screens in accordance with the offset origin.

13. The method of claim 1, wherein one of the screens is a remote screen;

the second driver is a remote control device driver driving the remote screen; and the method further comprises updating the remote screen to match another one of the screens.

14. Computer software, residing on a computer-readable storage medium, comprising instructions for use in a computer system to allocate display information among a plurality of display screens in the computer system, the instructions causing the system to:

identify a first function provided by a first display device driver and a second function provided by a second display device driver, the functions and the device drivers configured to allow at least one of the display screens to be updated in accordance with the display information, the first function and the first driver corresponding to one of the screens, the second function and the second driver corresponding to another of the screens;

replace an original pointer to the first function with a redirection pointer;

configure a capability attribute, the configuration reflecting a capability common to both drivers;

use the redirection pointer to redirect a function call comprising the display information, the function call originally directed to the first function;

process the display information to derive new display information in accordance with the configured capability attribute; and update at least one of the screens by causing a new function call directed to one of the functions, the new function call comprising the new display information.

15. The computer software of claim 14, wherein one of the drivers is unable to use a color usable by the other driver and the new information comprises a new color.

16. The computer software of claim 14, wherein one of the drivers is unable to use a color palette usable by the other driver and the new information comprises information regarding a new color palette.

17. The computer software of claim 14, wherein one of the drivers is unable to use a data construct configured for use by the other driver and the new information comprises information regarding a new data construct.

18. The computer software of claim 14, wherein the computer software further comprises instructions for causing the system to configure another capability attribute to reflect a predetermined configuration regardless of whether the corresponding capability is common to both drivers.

19. The computer software of claim 14, wherein the computer software further comprises instructions for causing the system to configure another capability attribute to reflect a configuration appropriate for one of the drivers regardless of whether the corresponding capability is common to both drivers.

20. The computer software of claim 14, wherein each driver drives a computer display adapter configured to drive the corresponding screen.

21. The computer software of claim 14, wherein the computer software further comprises instructions for causing the system to re-instate the original pointer to the first function without shutting down the computer system.

22. The computer software of claim 14, wherein the computer software further comprises instructions for causing the system to re-instate the original pointer to the first function without shutting down an application program.

23. The computer software of claim 14, wherein the display information comprises an original data construct configured for use by the first driver; and wherein the computer software further comprises instructions for causing the system to derive from the original data construct a new data construct configured for use by the second driver.

24. The computer software of claim 23, wherein the computer software further comprises instructions for causing the system to re-derive the new data construct before another use by the second driver.

25. The computer software of claim 14, wherein the computer software further comprises instructions causing the computer system to:

provide one of the drivers with an offset origin; and provide coordinates to the one of the drivers for updating at least one of the display screens in accordance with the offset origin.

26. The computer software of claim 14, wherein one of the screens is a remote screen;

the second driver is a remote control device driver driving the remote screen; and the computer software further comprises instructions causing the computer system to update the remote screen to match another one of the screens.

* * * * *

UNITED STATES PATENT AND TRADEMARK OFFICE
CERTIFICATE OF CORRECTION

PATENT NO. : 6,104,359
DATED : August 15, 2000
INVENTOR(S) : Raymond E. Edres; Sturart T. Laney; Andre F. Vachon It is certified that error appears in the above-identified patent and that said Letters Patent is hereby corrected as shown below:

Column 3,
Line 28, change "Windows ® 97" to -- Windows ® 95 --

Column 4,
Line 1, change "Windows ® 97" to -- Windows ® 95 --
Line 21, change "Windows ® 97" to -- Windows ® 95 --
Line 61, after "an" change "enduser" to -- end-user --

Column 6,
Line 2, after "to" delete [the]

Column 7,
Line 38, after "the" change "enduser" to -- end-user --

Column 9,
Line 36, after "Windows® NT™" delete [M]
Line 60, after "function" change ""BitBlt()" to -- "BitBlt() --

Column 13,
Line 27, after "as" change "dpcaps1" to -- dpCaps1 --
Line 29, change "dpcaps1" to -- dpCaps1 --
Line 32, change "CL_CMYK_ABLE" to -- C1_CMYK_ABLE --

Signed and Sealed this

Twenty-fifth Day of December, 2001

*Attest:*

JAMES E. ROGAN
*Attesting Officer*     *Director of the United States Patent and Trademark Office*